United States Patent [19]

Sakakibara et al.

[11] Patent Number: 5,503,126
[45] Date of Patent: Apr. 2, 1996

[54] IGNITION TIMING CONTROL SYSTEM FOR INTERNAL COMBUSTION ENGINES

[75] Inventors: Koji Sakakibara, Hekinan; Hirohiko Yamada, Anjo, both of Japan

[73] Assignee: Nippondenso Co., Ltd., Kariya, Japan

[21] Appl. No.: 246,599

[22] Filed: May 20, 1994

[51] Int. Cl.$^6$ ........................................................ F02P 5/15
[52] U.S. Cl. ............................................................. 123/425
[58] Field of Search ................................... 123/425, 435

[56]  References Cited

U.S. PATENT DOCUMENTS

| | | | |
|---|---|---|---|
| 4,694,800 | 9/1987 | Morita | 123/425 |
| 4,711,212 | 12/1987 | Haraguchi et al. | 123/425 |

FOREIGN PATENT DOCUMENTS

| | | |
|---|---|---|
| 1-92583 | 4/1989 | Japan. |
| 5-164032 | 6/1993 | Japan. |

Primary Examiner—Tony M. Argenbright
Attorney, Agent, or Firm—Cushman, Darby & Cushman

[57] ABSTRACT

An ignition timing control system for an internal combustion engine includes a basic ignition timing calculating unit for calculating a basic ignition timing of the engine and a low limit ignition timing calculating unit for calculating a low limit ignition timing of the engine, both being calculated according to an operating state of the engine. The system includes a retardation angle calculating unit for calculating a retardation angle that is retarded from the basic ignition timing. It also includes an advance angle calculating unit for calculating an advance angle that is advanced from a value corresponding to the low limit ignition timing depending on whether knocking is occurring in the engine. An operating state predicting unit is included for predicting an operating state of the engine where knocking is likely to occur. The system also includes an ignition timing control unit for controlling the ignition timing separately depending on whether a knocking is likely to occur in the engine.

11 Claims, 9 Drawing Sheets

F I G. 14
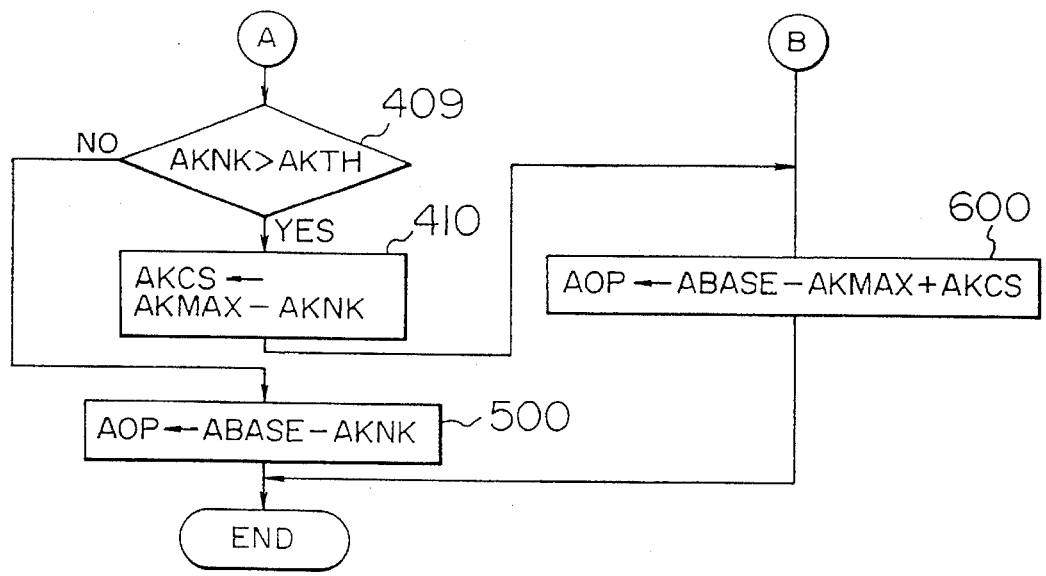
F I G. 15
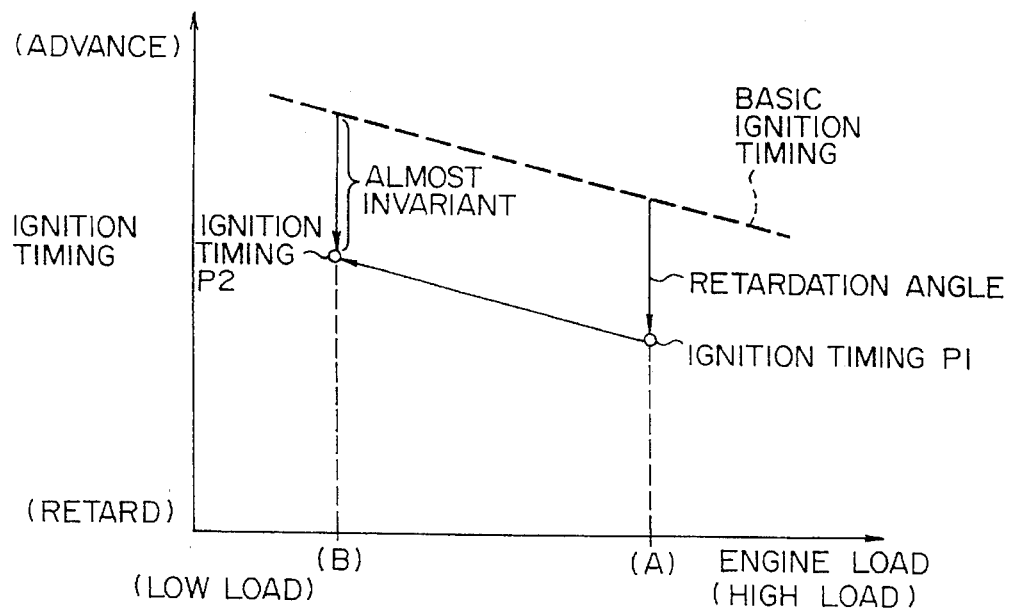

IGNITION TIMING CONTROL SYSTEM FOR INTERNAL COMBUSTION ENGINES

BACKGROUND OF THE INVENTION

The present invention relates to an ignition timing control system for internal combustion engines, and more particularly to an ignition timing control system which senses knocking in an internal combustion engine and which controls an ignition timing of the internal combustion engine based on whether knocking is sensed.

A technique of controlling an ignition timing in a feedback manner is well known. This technique comprises the steps of sensing knocking in an internal combustion engine. The ignition timing is then retarded gradually from the basic ignition timing if the occurrence of knocking is determined in the internal combustion engine, or the ignition timing is adjusted to gradually approach an optimal ignition timing if no knocking is sensed. Thus, if knocking is occurring, the ignition timing is controlled to be retarded so as to prevent any greater knocking from occurring. In contrast, if no knocking is occurring, the ignition timing is advanced, thereby increasing an output of the internal combustion engine and decreasing the fuel consumption thereof.

This technique, however, is designed to control an ignition timing in accordance with a state of occurrence of knocking so as to be advanced or retarded by a predetermined amount of angle from the basic ignition timing determined based on a rotational speed of the internal combustion engine and a load thereon. Therefore, this technique has a disadvantage as described below.

That is, referring to FIG. 15, suppose that the engine load is suddenly changed from the state (A) to the state (B) when a driver has suddenly changed an operation amount of an accelerator, for example. Since the ignition timing is set based on a basic ignition timing (shown by a broken line in FIG. 15) and a retardation angle from the basic ignition timing gradually changes as described above, a retardation angle from the basic ignition timing hardly changes in such a short time. Therefore, the ignition timing has a value as shown by a point (P2) in FIG. 15. As a result, though the internal combustion engine has changed to an operating state where knocking is unlikely to occur, the ignition timing is set to an ignition timing point retarded by a predetermined amount from the basic ignition timing. This has caused a reduction in an output of and a loss of the torque of the internal combustion engine.

SUMMARY OF THE INVENTION

The present invention has been made to solve the foregoing problem. Then, an object of the present invention is to provide an ignition timing control system operated by sensing knocking in an internal combustion engine which is capable of controlling the ignition timing to have an optimum value without incurring a loss of the torque of the internal combustion engine.

For the purpose of attaining the above object, the present invention proposes an ignition timing control system for internal combustion engines which includes: as shown in FIG. 1, a basic ignition timing calculating unit for calculating a basic ignition timing of an internal combustion engine according to an operating state of the internal combustion engine; a low limit ignition timing calculating unit for calculating a low limit ignition timing of the internal combustion engine predetermined according to the operating state of the internal combustion engine; a retardation angle calculating unit for calculating a retardation angle retarding from the basic ignition timing depending on whether or not knocking occurs in the internal combustion engine; an advance angle calculating unit for calculating an advance angle advancing from a value corresponding to the low limit ignition timing depending on whether or not knocking occurs in the internal combustion engine; a first ignition timing calculating unit for calculating an ignition timing of the internal combustion engine by correcting a calculation result of the basic ignition timing calculating unit based on a calculation result of the retardation angle calculating unit; a second ignition timing calculating unit for calculating an ignition timing of the internal combustion engine by correcting a calculation result of the low limit ignition timing calculating unit based on a calculation result of the advance angle calculating means; an operating state predicting unit for predicting an operating state of the internal combustion engine where knocking is likely to occur; and an ignition timing control unit for controlling the ignition timing of the internal combustion engine based on a prediction result of the operating state predicting unit by using a calculation result of the second ignition timing calculating unit in an operating state where knocking is likely to occur, and for controlling the ignition timing of the internal combustion engine by using a calculation result of the first ignition timing calculating unit in an operating state where knocking is unlikely to occur.

According to the present invention, the ignition timing control system calculates, depending on whether or not knocking occurs in the internal combustion engine, a retardation angle from the fundamental ignition timing and an advance angle from a value corresponding to the low limit ignition timing which is determined in accordance with an operating state of the internal combustion engine.

Further, the ignition timing control unit controls the ignition timing of the engine based on a prediction result of the operating state predicting unit which indicates whether or not knocking is likely to occur. That is, the ignition timing control unit operates to control an ignition timing of the internal combustion engine by using the ignition timing obtained by correcting the low limit ignition timing by using the advance angle when the prediction result indicates that knocking is likely to occur. Alternatively, the ignition timing control unit controls the timing of the engine using the ignition timing obtained by correcting the basic ignition timing using the retardation angle when the prediction result indicates that knocking is unlikely to occur. Thus, even in an operating state of the internal combustion engine which has suddenly changed causing knocking to be unlikely to occur, the ignition timing is not set to the retardation side.

BRIEF DESCRIPTION OF THE DRAWINGS

FIG. 14 is a flowchart showing a further ignition timing setting process according to the second embodiment of the present invention; and FIG. 15 is a graph showing a change of the ignition timing for explaining a conventional ignition timing setting process.

DESCRIPTION OF THE PREFERRED EMBODIMENTS

Embodiments of the present invention will be explained in detail with reference to the accompanying drawings.

Figure 1:
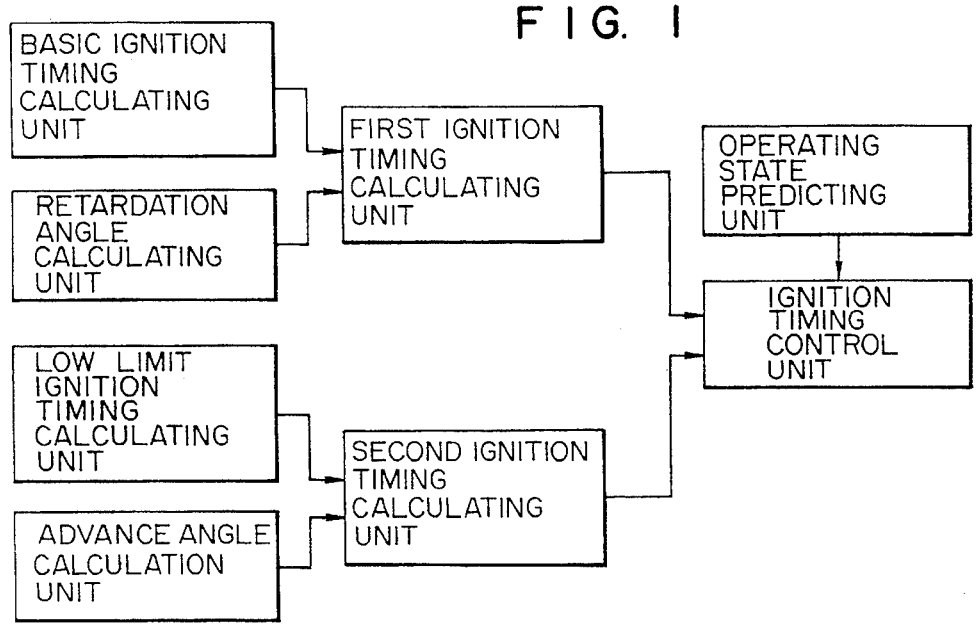
FIG. 1 is a functional block diagram showing an ignition timing control system for internal combustion engines according to an embodiment of the present invention.
Figure 2:
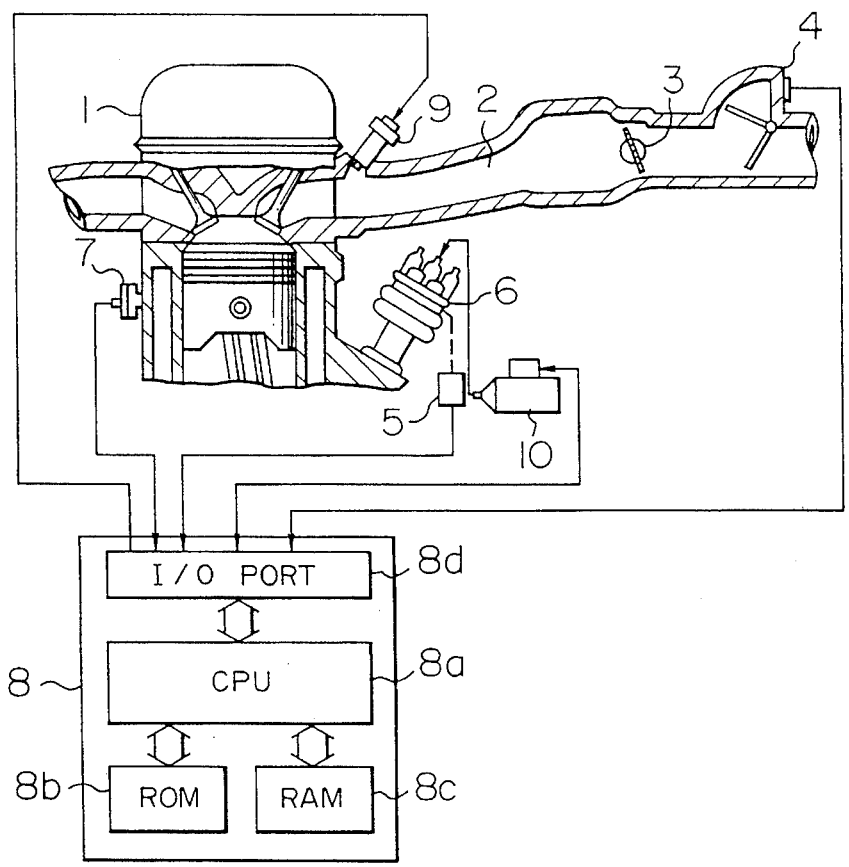
FIG. 2 is a schematic block diagram showing an arrangement of an embodiment of the present invention.

FIG. 2 is a schematic block diagram showing a construction of the ignition timing control system of the embodiments of the present invention.

In FIG. 2, a numeral 1 denotes an internal combustion engine. Numeral 2 denotes an intake pipe for supplying intake air introduced from an air cleaner (not shown) to the internal combustion engine 1. Numeral 3 denotes a throttle valve operated to be opened or closed interlinked with the operation of an accelerator pedal (not shown) to control an intake air quantity Q supplied to the internal combustion engine 1. Numeral 4 denotes an air flow meter for measuring the intake air quantity Q. The air flow meter 4 includes a potentiometer and operates no generate an electric signal of an analog voltage which is proportional to the intake air quantity Q and is inputted to an electronic control unit described later.

Numeral 5 denotes a rotational angle sensor built in a distributor 6. The rotation angle sensor 5 operates to output a signal at every predetermined crank angle and generate a signal for obtaining a rotational speed Ne of the internal combustion engine 1 (referred to as an engine rotational speed). Numeral 7 denotes a knocking sensor which is arranged in a cylinder block in the body of the internal combustion engine 1 to sense knocking from vibrations of the cylinder block, for example. The output signals from the rotational angle sensor 5 and the knocking sensor 7 are input to the electronic control unit in the same way as the electric signal from the air flow meter 4.

Numeral 8 denotes a known electronic control unit (referred to simply as ECU) which operates to calculate an optimum control quantity for each of the ignition system and the fuel supply system based on sensing signals outputted from the above-mentioned sensors as well as the other sensors (not shown) for sensing an operating state of the internal combustion engine and to output a control signal for precisely controlling an injector, an ignitor, etc., described later. Further, the ECU is constructed to include a known CPU 8a for performing a calculation processing, a read-only memory unit ROM 8b for storing a control program and control constants necessary for the calculation, a temporary memory unit RAM 8c for temporarily storing calculation data while the calculating unit 8a is in operation, and an I/O port 8d for inputting and outputting signals to and from the ECU 8.

Numeral 9 denotes an injector for supplying fuel to the internal combustion engine 1 at an optimum timing and with an optimum fuel injection amount, based on a control signal from the ECU 8. Numeral 10 denotes an ignitor which operates to generate a high voltage necessary for igniting ignition plugs (not shown) of the internal combustion engine 1 at an optimum timing based on a control signal from the ECU 8 in the same way.

Next, the operation of setting an ignition timing AOP performed by the ECU 8 in the first embodiment of the present invention will be described with reference to the flowcharts of FIGS. 3 and with reference to 4 and FIG. 7 which is an explanatory diagram illustrating the process operation. The routine shown in each of FIGS. 3 and 4 is executed at every predetermined rotational angle (for example, at every 120° CA in a six-cylinder internal combustion engine).

Figure 3:
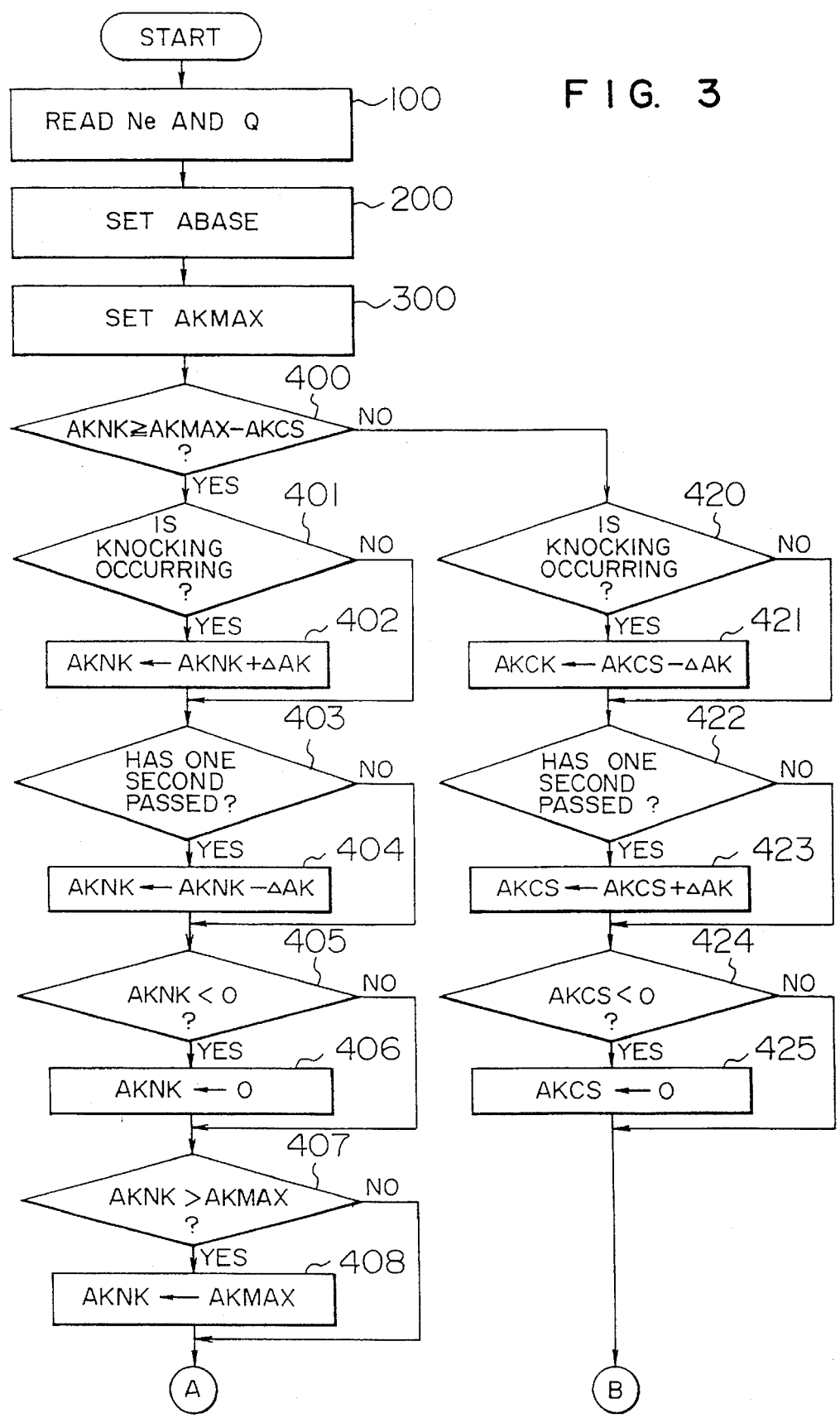
FIG. 3 is a flowchart showing an ignition timing setting process according to a first embodiment of the present invention.
Figure 4:
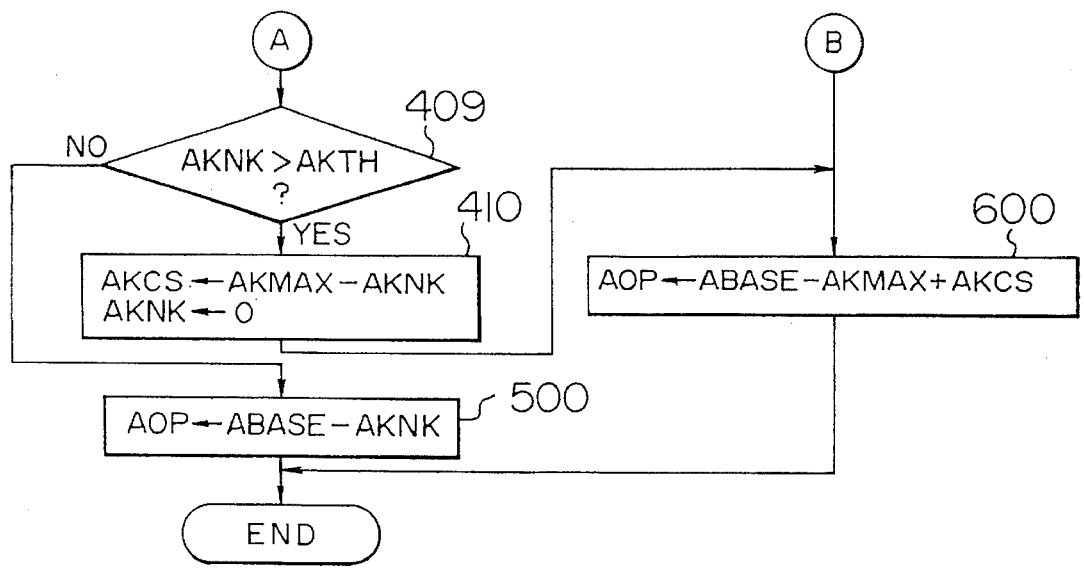
FIG. 4 is a flowchart showing a further ignition timing setting process according to the first embodiment of the present invention.

At step 100 in FIG. 3, the operation is executed to read an engine rotational speed Ne obtained from the sensing signal of the rotational angle sensor 5 and an intake air quantity Q obtained from the sensing signal of the air flow meter 4. At step 200, the basic ignition timing ABASE (item (a) in FIG. 7) is set based on the engine rotational speed Ne and the intake air quantity Q read at step 100.

Figure 5:
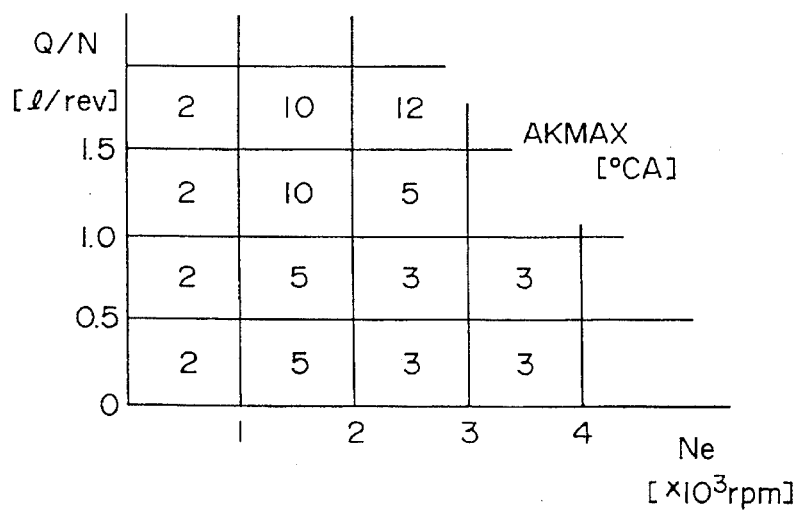
FIG. 5 shows a two-dimensional map representing values of the maximum retardation angle AKMAX.
Figure 7:
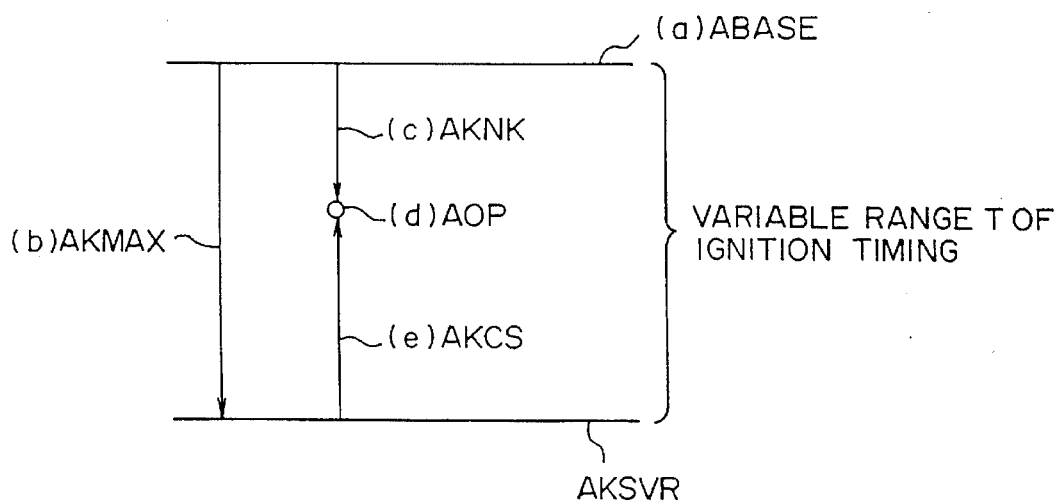
FIG. 7 is an explanatory diagram illustrating an operation of each of the processes shown in FIGS. 3 and 4.

At step 300, a maximum retardation angle AKMAX (item (b) in FIG. 7) is set by performing an interpolation according to the state of the internal combustion engine. More precisely, the interpolation is performed based on a two-dimensional map which shows the relation between the engine rotational speed Ne and the engine load Q/N (where Q is an intake air quantity and N is a number of rotation of the engine per minute) as shown in FIG. 5. The maximum retardation angle AKMAX is the largest retardation angle retarded from the basic ignition timing ABASE. By performing retarding control of the basic ignition timing ABASE by using the maximum retardation angle AKAMX, it is possible to obtain the low limit value AKSVR (the low limit ignition timing) of the retardation angle in the current operating state of the internal combustion engine.

At step 400, it is determined whether or not the retardation angle AKNK is equal to or more than a deviation (AKMAX−AKCS) between the maximum retardation angle AKMAX and the advance angle AKCS. If yes, the processing proceeds to step 401. If no, the processing proceeds to a step 420.

Figure 6:
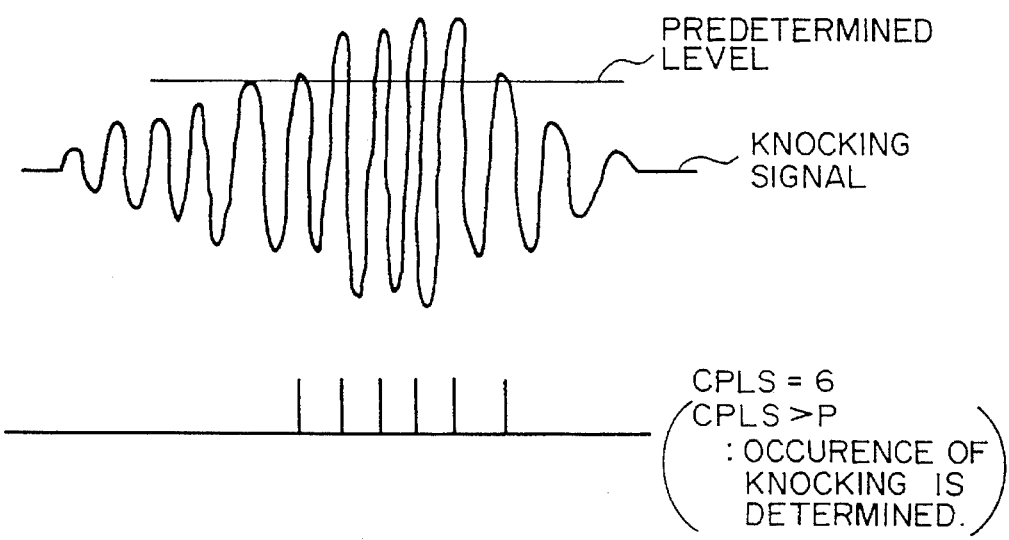
FIG. 6 is an explanatory view illustrating a knocking sensing process.

At step 401, it is determined whether or not knocking is occurring. If yes, the processing proceeds to step 402. The determination of knocking at this step is made by a known method including the steps of (1) comparing a signal (knocking sensor signal) sent from the knocking sensor 7 with a predetermined level as shown in FIG. 6, (2) counting the number of the knocking sensor signals equal to or higher than a predetermined level, (3) comparing the resultant count CPLS with a predetermined value P, and (4) determining the occurrence of knocking if the resultant count is equal to or larger than the predetermined value P. Alternatively, it may be possible to use a method such as that disclosed in JP-A-62-131975.

At step 402, a predetermined quantity ΔAK is added to the retardation angle AKNK [item (c) in FIG. 7] which is retarding from the basic ignition timing ABASE (AKNK←AKNK+ΔAK). If it is determined that no knocking is occurring at step 401, the processing jumps to step 403 without executing the processing of step 402.

At step 403, a timer is checked to determine whether or not one second has elapsed. Here, the timer counts from 0 second to 1 second. If the count reaches one second, the timer is reset to restart again. If occurrence of knocking is determined at step 401, the timer is also reset. If it is determined that one second has elapsed, the processing proceeds to step 404 where the predetermined quantity ΔAK is subtracted from the retardation angle AKNK (AKNK←AKNK−ΔAK). If one second has not elapsed, the processing jumps to step 405 without executing the processing of step 404.

By executing steps 401 to 404 as described above, the retardation angle AKNK is increased by the predetermined quantity ΔAK when knocking is occurring. Alternatively, the retardation angle AKNK is decreased by the predetermined quantity ΔAK at every elapse of one second when no knocking is occurring. Accordingly, when knocking has occurred, the ignition timing AOP [item (d) in FIG. 7] described later is retarded from the basic ignition timing ABASE. If no knocking has occurred, the ignition timing AOP is controlled to approach the basic ignition timing ABASE at every lapse of one second.

At step 405, it is determined whether or not the above updated retardation angle AKNK is smaller than zero. If yes, the processing proceeds to step 406 where the retardation angle AKNK is set to zero (AKNK←0). If the retardation angle AKNK is equal to or greater than zero, the processing proceeds to step 407 without executing the processing of step 406. At step 407, it is determined whether or not the retardation angle AKNK is greater than the maximum retardation angle AKMAX. If it is greater, the processing proceeds to step 408 where the retardation angle AKNK is set to the maximum retardation angle AKMAX (AKNK←AKMAX). Consequently, the retardation angle AKNK is limited to have a value that is equal to or greater than zero but equal to or smaller than the maximum retardation angle AKMAX. (That is, the retardation angle AKNK is confined within the range T shown in FIG. 7.)

At step 409 in FIG. 4, it is determined whether or not the retardation angle AKNK is greater than a predetermined value AKTH. If yes, the processing proceeds to step 410. Here, the predetermined value AKTH is a constant that is set to a value within the range from 2° to 5° CA. The predetermined value AKTH will be discussed later in detail.

At step 410, the advanced angle AKCS [item (e) in FIG. 7] from the low limit value AKSVR is set to a value obtained by the following expression (1), and the retardation angle AKNK is set to zero (AKNK←0).

$$AKCS = AKMAX - AKNK \quad (1)$$

On the other hand, if at step 409 it is determined that the retardation angle AKNK is not greater than the predetermined value AKTH, the processing proceeds to step 500 without executing the processing of step 410.

At step 500, the final ignition timing AOP [item (d) in FIG. 7] is calculated by the following expression (2), and then this routine is terminated.

$$AOP = ABASE - AKNK \quad (2)$$

On the other hand, if, at step 400, the retardation angle AKNK is determined to be smaller than the deviation (AKMAX−AKCS), the processing proceeds to step 420 where it is determined whether or not knocking is occurring like step 401. If knocking is occurring, the processing proceeds to step 421.

At step 421, the predetermined quantity ΔAK is subtracted from the advance angle AKCS which is advancing from the low limit value AKSVR (AKCS←AKCS−ΔAK). At step 420, if it is determined that no knocking is occurring, the processing jumps to step 422 without executing the processing of step 421. At step 422, like step 403, the timer is checked to determine whether or not one second has elapsed. If one second has elapsed, the processing proceeds to step 423 where the predetermined quantity ΔAK is added to the advance angle AKCS (AKCS←AKCS+ΔAK). On the other hand, if one second has not elapsed, the processing jumps to step 424 without executing the processing of step 423.

By executing steps 420 to 423 as described above, the advance angle AKCS is reduced by the predetermined quantity ΔAK when knocking is occurring. Alternatively, the advance angle AKCS is increased by the predetermined quantity ΔAK at every lapse of one second when no knocking is occurring. Accordingly, if knocking has occurred, the final ignition timing AOP [item (d) in FIG. 7] described later is controlled to be retarded from the basic ignition timing ABASE. If no knocking has occurred, the final ignition timing AOP is controlled to approach the basic ignition timing ABASE at every lapse of one second.

At step 424, it is determined whether or not the above updated advance angle AKCS is smaller than zero. If smaller, the processing proceeds to step 425 where the advance angle AKCS is set to zero (AKCS←0). At step 600, the final ignition timing AOP is calculated by the following expression 3, and then this routine is terminated.

$$AOP = ABASE - AKMAX + AKCS \quad (3)$$

Thus, by executing the above-mentioned processings, when the advance angle AKCS is equal to or greater than the maximum retardation angle AKMAX, the ignition timing AOP can be obtained by subtracting the retardation angle AKNK from the basic ignition timing ABASE [expression (2)]. When the advance angle AKCS is smaller than the maximum retardation angle AKMAX, the ignition timing AOP can be obtained by subtracting the maximum retardation angle AKMAX from the basic ignition timing ABASE and then adding the advance angle AKCS to the resultant value thereof [expression (3)].

Next, the foregoing process for setting the ignition timing AOP will be explained in more detail with reference to FIGS. 8 to 11. In FIGS. 8 to 11, the abscissa denotes an engine load Q/N and the ordinate denotes an ignition timing.

Figure 8:
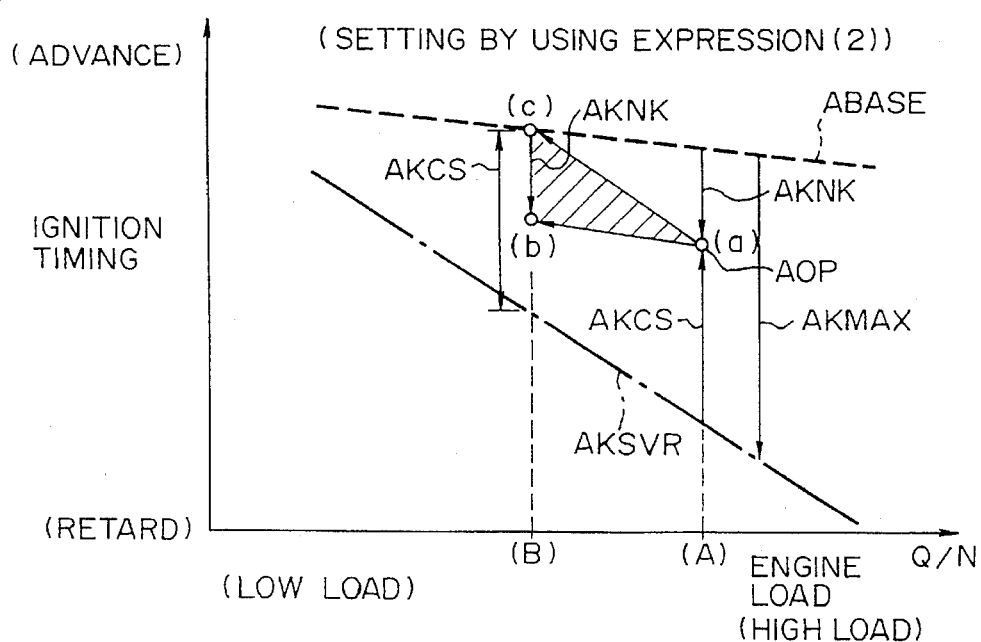
FIG. 8 is a graph showing a change of the ignition timing for explaining an advantage of the embodiment of the present invention.
Figure 9:
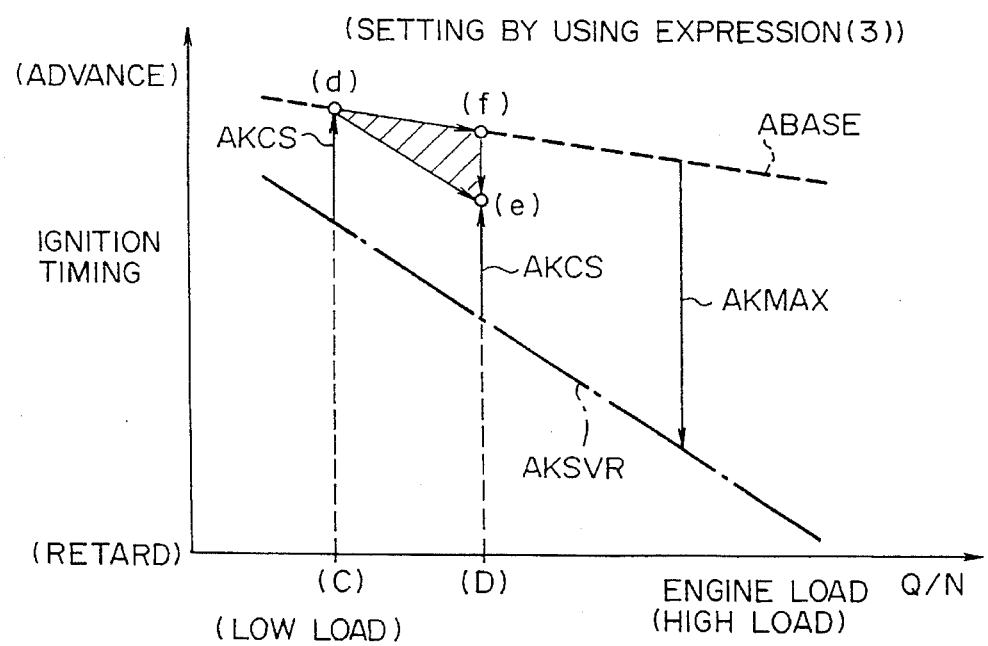
FIG. 9 is another graph showing a change of the ignition timing for explaining an advantage of the embodiment of the present invention.

At first, a description will be made of a case where the ignition timing is obtained solely by the expression (2) or (3) as shown in FIG. 8 or FIG. 9, respectively. Since the basic ignition timing ABASE and the low limit value AKSVR are determined based on the state of the internal combustion engine, they change as shown by broken lines and alternate long and short dash lines in FIGS. 8 to 11, respectively.

In FIG. 8, for example, suppose that the initial operating state of the internal combustion engine (the engine load Q/N) is at the point (A) and then the operating state of the engine is changed instantaneously to the point (B) due to a change of a depression amount of the accelerator by the driver. In this case, the ignition timing AOP is initially set to the point (a) in FIG. 8. Then, when the operating state of the internal combustion engine is changed instantaneously to the point (B) in FIG. 8, the basic ignition timing ABASE changes as shown by a broken line in FIG. 8. However, since the change of the retardation angle AKNK is gradual, the instantaneous change of the internal combustion engine keeps the retardation angle AKNK substantially constant. Therefore, if the ignition timing AOP is set to a value calculated by the expression 2 after the operating state of the engine has changed, the ignition timing AOP will be set to the point (b) in FIG. 8.

On the other hand, since the advance angle AKCS also changes gradually like the retardation angle AKNK, with such a sudden change of the operating state of the internal combustion engine, the advance angle AKCS also remains substantially constant. Accordingly, if the ignition timing AOP is set to a value calculated by the expression 3, the ignition timing AOP will be set to the point (c) in FIG. 8.

That is, since the ignition timing is set to a value calculated by the expression (2) under a low load condition where no knocking occurs, the ignition timing is set to a value on the side of retardation. Therefore, it is not possible to obtain a sufficient output from the internal combustion engine. As a result, a torque loss takes place in the hatched portion shown in FIG. 8, as compared with the case where the ignition timing has been set to a value calculated by the expression (3).

On the other hand, when the ignition timing is set using the expression 3 as shown in FIG. 9 and when the operating state of the internal combustion engine suddenly changes from the state (C) to the state (D) shown in FIG. 9, any sudden change of the advance angle AKCS does not take place as described above. Hence, the ignition timing AOP is changed from the point (d) to the point (e) in FIG. 9. Thus, if the ignition timing AOP is set in the way as shown in FIG. 9, the ignition timing AOP is controlled to be retarded as shown in FIG. 9, so that a torque loss corresponding to the hatched portion shown in FIG. 9 takes place.

Figure 10:
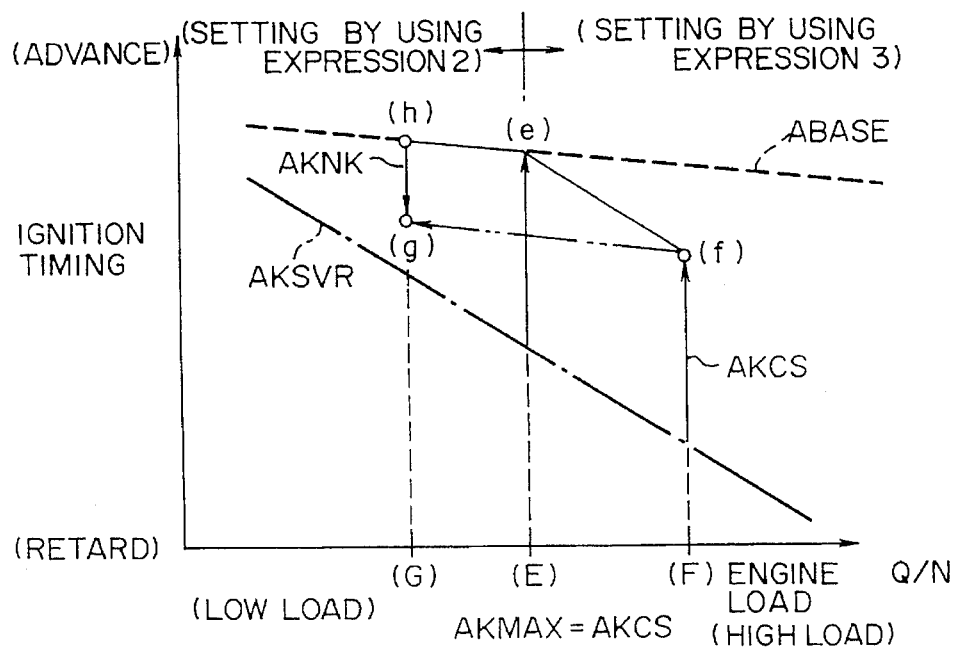
FIG. 10 is a further graph showing a change of the ignition timing for explaining an advantage of the embodiment of the present invention.

In order to overcome this disadvantage, the system of this embodiment is arranged so that, when the retardation angle AKNK is equal to or greater than the deviation (AKMAX−AKCS) between the maximum retardation angle AKMAX and the advance angle AKCS, the ignition timing AOP is obtained based on the expression (2). When the retardation angle AKNK is smaller than the deviation (AKMAX−AKCS), the ignition timing AOP is obtained based on the expression (3). That is, as shown in FIG. 10, when the operating state of the internal combustion engine changes from the state (F) to the state (E) the retardation angle AKNK is equal to the deviation (AKMAX−AKCS). Hence, when the operating state of the internal combustion engine stays on the lighter load side with respect to the operating state (E) shown in FIG. 10, the ignition timing AOP is obtained based on the expression (2). When the operating state of the internal combustion engine stays on the higher load side with respect to the operating state (E) shown in FIG. 10, the ignition timing AOP is obtained based on the expression (3).

As a result, by setting the ignition timing AOP as mentioned above, the ignition timing AOP is changed in the sequence from (f) through (e) to (h). Thus, as compared with the case where the ignition timing AOP is obtained based only on the expression (2) (in this case, the ignition timing changes from (f) to (g) in FIG. 10), the ignition timing AOP is not set to the retardation side when the operating state of the internal combustion engine stays in the operating state (E) in FIG. 10. This is advantageous in reducing a torque loss of the internal combustion engine.

Further, when the operating state of the internal combustion engine changes from the state (C) to (D) in FIG. 9, since the retardation angle AKNK is smaller than the deviation (AKMAX−AKCS), the ignition timing AOP changes from (d) to (f) in FIG. 9 in accordance with the calculation based on the expression (2). This also contributes to prevent occurrence of a torque loss.

Figure 11:
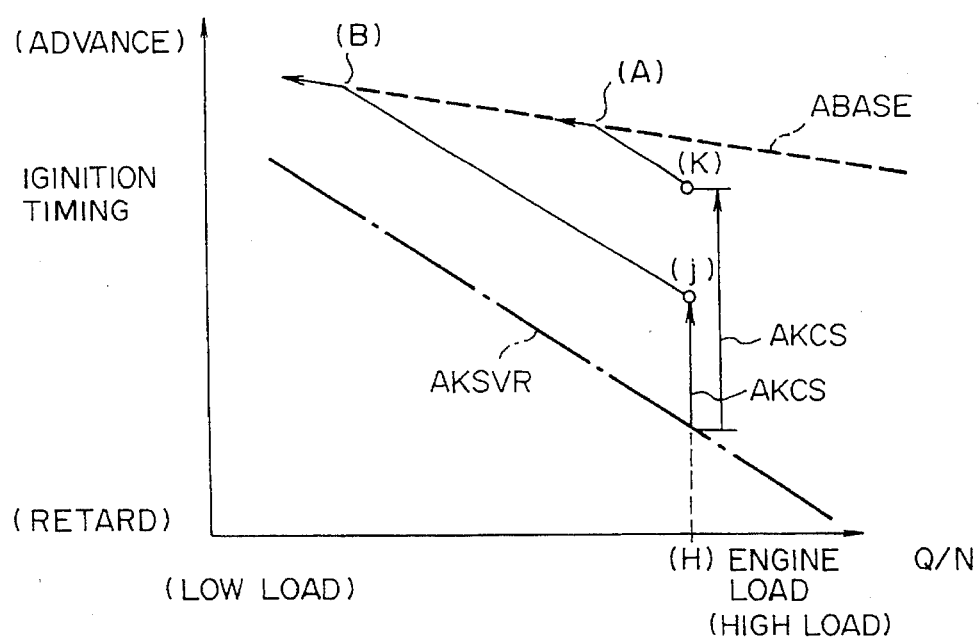
FIG. 11 is a still further graph showing a change of the ignition timing for explaining an advantage of the embodiment of the present invention.

When the operating state of the internal combustion engine stays in the operating state (H) shown in FIG. 11, the advance angle AKCS may be set to the point (k) or the point (j) shown in FIG. 11 based on three factors: the octane value of used gasoline, the combustion characteristic of each internal combustion engine or a change with time in the performance of each internal combustion engine. In comparing both of the points (k) and (j) with each other, the case of the point (j) in FIG. 11 corresponds to an internal combustion engine in which knocking is likely to occur. If the method of setting the ignition timing AOP is switched on the high load side in such an internal combustion engine, knocking would be apt to occur. In order to overcome this disadvantage, as described in this embodiment, the method of setting the ignition timing AOP is changed depending on whether or not the retardation angle AKNK is equal to or greater than the deviation (AKMAX−AKCS). By virtue of this arrangement, as shown in FIG. 11, the larger the advance angle AKCS is when the internal combustion engine stays in the state (H) in FIG. 11, the method of setting the ignition timing AOP is switched on the higher load side. Accordingly, in the internal combustion engine in which knocking is likely to occur, the ignition timing setting method is automatically switched on the lighter load side where knocking is unlikely to occur. This makes it possible to prevent knocking after switching the ignition timing AOP.

Figure 12:
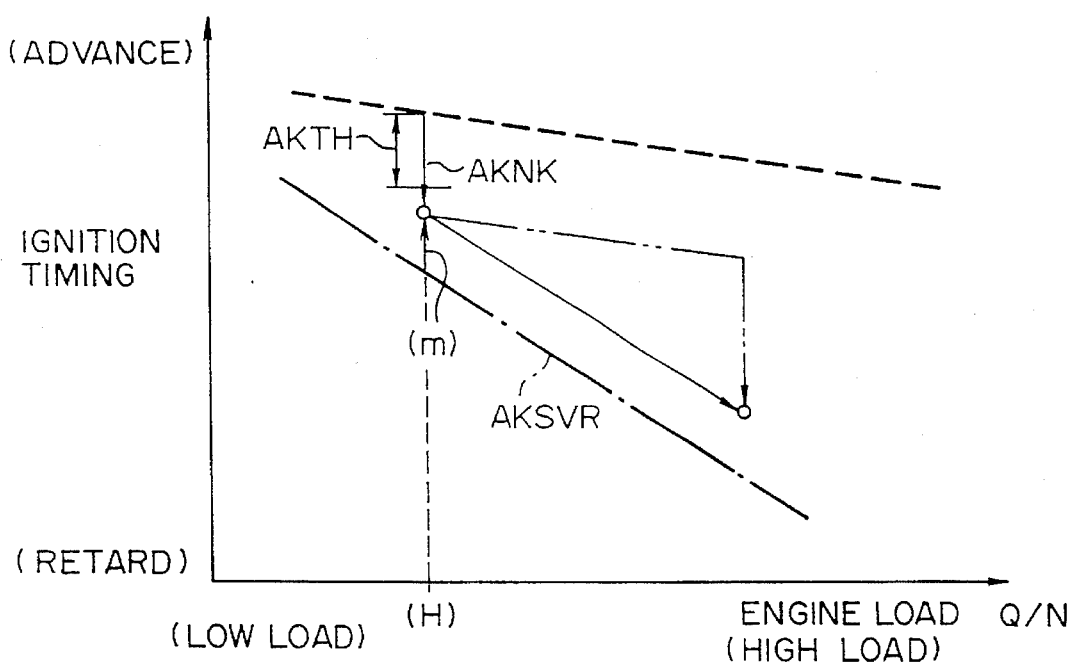
FIG. 12 is a further explanatory graph for illustrating an operation of each of the processes shown in FIGS. 3 and 4.

Next, a description will be made of the processings of steps 409 and 410 shown in FIG. 4 with reference to FIG. 12. In FIG. 12, when the operating state of the internal combustion engine is represented by the state (H) in FIG. 12, knocking likely occurs due to a change of the octane value of used gasoline, for example. Hence the ignition timing AOP is set sharply to the side of retardation as compared with the ignition timing which has been set by that time. At this time, as described above, if the ignition timing AOP is obtained using the expression (2) until the operating state of the engine is reached where the advance angle AKCS becomes greater than the maximum retardation angle AKMAX, the ignition timing AOP is controlled as shown by an alternate long and two short dashes line in FIG. 12. Therefore, although the engine stays in an operating state where knocking is likely to occur, the ignition timing AOP is set still on the side of the advanced angle (on the side of the basic ignition timing ABASE), thereby rendering knocking likely. In order to solve this problem, when the retardation angle AKNK becomes greater than the predetermined value AKTH, the method of setting the ignition timing AOP is immediately switched to the use of the expression 3, and the advance angle AKCS is updated by using the expression 1. Hence, it becomes possible to set the ignition timing AOP to a value as indicated by a solid line in FIG. 12 so that frequent knocking may be prevented. Here, the predetermined value AKTH is set to a value which is 2 to 5 times as large as the predetermined quantity ΔAK which is used to correct the retardation angle AKNK and the advance angle AKCS.

In this embodiment, the foregoing processing steps (steps 409 and 410) are added to overcome the above-described disadvantage. However, in place of adding these steps, the method of setting the ignition timing AOP may be switched by making a comparison between the advance angle AKCS and the maximum retardation angle AKMAX.

Figure 13:
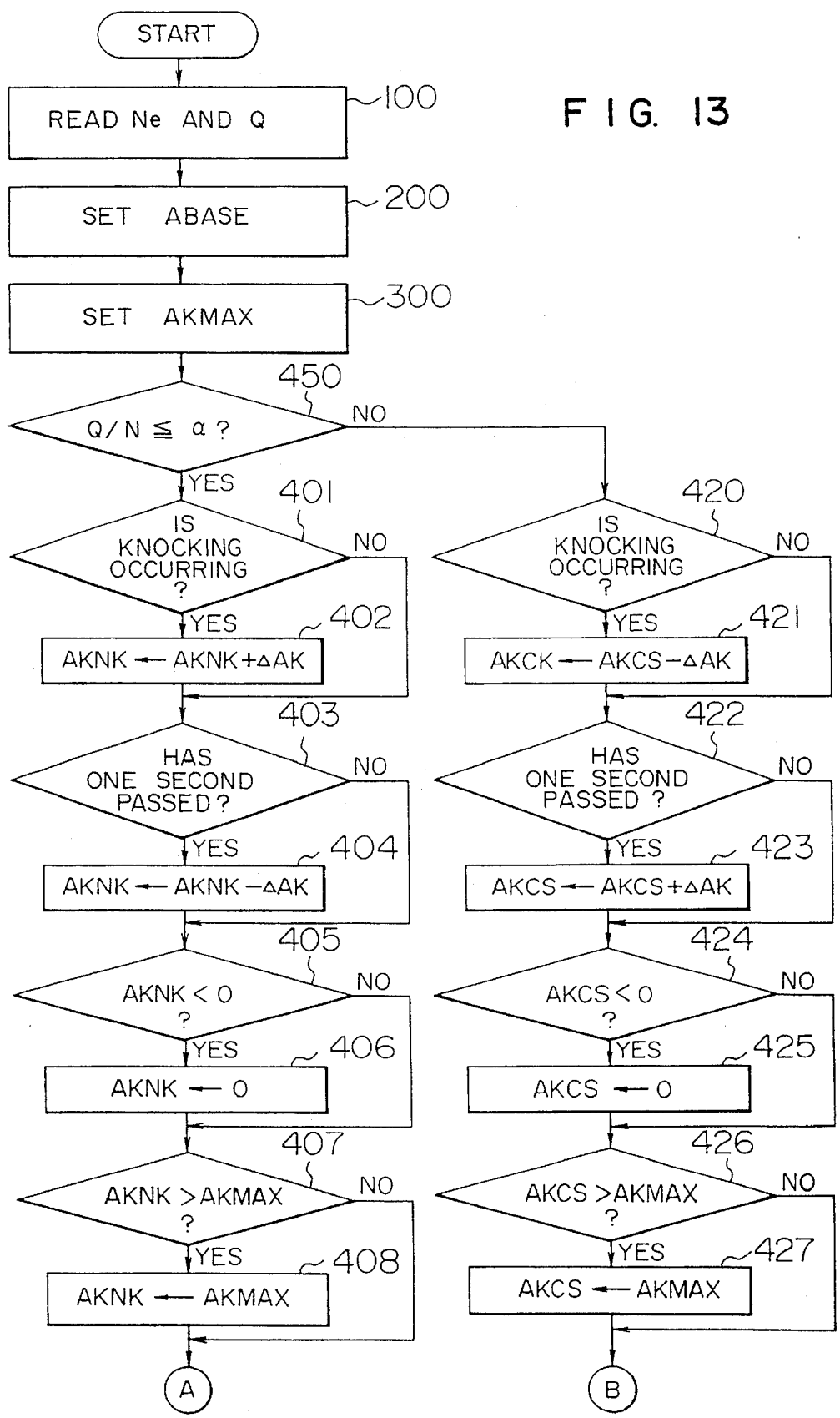
FIG. 13 is a flowchart showing an ignition timing setting process according to a second embodiment of the present invention.

Next, a description will be made of a method of setting the ignition timing AOP in the system according to the second embodiment of the present invention with reference to FIGS. 13 and 14. In these figures, the same processing steps as those shown in FIGS. 3 and 4 are denoted by the same reference numerals and are not described again. The routines shown in FIGS. 13 and 14 are executed at every predetermined rotational angle. Here, what is different from the processings shown in FIGS. 3 and 4 is the processing of a step 450. In the second embodiment, the state of a load on the internal combustion engine (Q/N) is sensed, and it is determined whether or not the load is equal to or smaller than the predetermined value $\alpha$. If it is equal to or smaller than the predetermined value $\alpha$, it is decided that the internal combustion engine is not carrying a heavy load. That is, it is decided that knocking is unlikely to occur in this state of the engine. Then, the process of setting the ignition timing AOP is executed at step 401 and the following steps. On the other hand, if it is decided at the step 450 that the load is higher than the predetermined value $\alpha$, the processings at step 420 and the following steps are executed to perform the setting of the ignition timing AOP.

In addition, the predetermined value $\alpha$ is selected beforehand to have a value suitable for each internal combustion engine. In this embodiment, the value of $\alpha=1.0$ 1/rev is selected. If the engine load is 1.0 1/rev or higher, the operating state of the engine is determined to be carrying a high load.

Thus, as described above, it is determined whether or not knocking is likely to occur in the internal combustion engine by checking the state of an load on the engine. If the engine load is equal to or higher than the predetermined value $\alpha$, it is determined that knocking is likely to occur in the engine. In this case, the ignition timing AOP is obtained by subtracting the maximum retardation angle AKMAX from the basic ignition timing ABASE and then adding the advance angle AKCS to the result of subtraction [the expression (3)]. In the other case, the ignition timing AOP is obtained by subtracting the retardation angle AKNK from the basic ignition timing ABASE. In the latter case, it is also possible to set the ignition timing AOP to a suitable value without incurring a torque loss.

However, the predetermined value $\alpha$ always remains constant even in a state where knocking is unlikely to occur due to a change of the octane value of used gasoline. Therefore, it is preferable to use the method of setting the ignition timing AOP as described in the first embodiment since that method allows a more suitable ignition timing AOP to be set for preventing a torque loss.

Further, the maximum retardation angle AKMAX is preliminarily set to a relatively large value under an operating condition of the engine where knocking is likely to occur. Therefore, if the maximum retardation angle AKMAX is equal to or greater than a predetermined value $\beta$, the ignition timing AOP may be obtained by subtracting the maximum retardation angle AKMAX from the basic ignition timing ABASE and then adding the advance angle AKCS to the result of subtraction (the expression 3). If the value of AKMAX is smaller than $\beta$, the ignition timing AOP may be obtained by subtracting the retardation angle AKNK from the basic ignition timing ABASE (the expression 2).

In the foregoing embodiments, the low limit value AKSVR of the ignition retardation angle (low limit ignition timing) is obtained by subtracting the maximum retardation angle AKMAX from the basic ignition timing ABASE. Instead, the low limit value AKSVR may be stored preliminarily in a two-dimensional map determined based on the engine load Q/N and the engine rotational speed Ne so that the low limit value AKSVR may be read out and used when required.

Further, the advance angle AKCS is defined as an advance angle starting from the low limit value AKSVR of the ignition retardation angle from which the ignition timing AOP cannot be retarded any more. Instead, the advance angle AKCS may be set to start from a value somewhat advanced from the low limit value AKSVR of the ignition retardation angle.

According to the present invention, if the internal combustion engine is in an operating state where knocking is likely to occur, the ignition timing of the internal combustion engine is obtained by correcting the low limit ignition timing by using the advance angle starting from the low limit ignition timing. If the internal combustion engine is in an operating state where knocking is likely to occur, the ignition timing of the internal combustion engine is obtained by correcting the basic ignition timing by using the retardation angle starting from the basic ignition timing. Accordingly, this invention has an excellent advantage that an optimum ignition timing can always be set without incurring a torque loss of the internal combustion engine.

What is claimed is:

1. An ignition timing control system for internal combustion engines comprising:

basic ignition timing calculating means for calculating a basic ignition timing of an internal combustion engine according to an operating state of said internal combustion engine;

low limit ignition timing calculating means for calculating a low limit ignition timing of said internal combustion engine based on said operating state of said internal combustion engine;

retardation angle calculating means for calculating a retardation angle that is retarded from said basic ignition timing based on whether knocking occurs in said internal combustion engine;

advance angle calculating means for calculating an advance angle that is advanced from a value corresponding to said low limit ignition timing based on whether knocking occurs in said internal combustion engine;

first ignition timing calculating means for calculating an ignition timing of said internal combustion engine by correcting a calculation result of said basic ignition timing calculating means based on a calculation result of said retardation angle calculating means;

second ignition timing calculating means for calculating said ignition timing of said internal combustion engine by correcting a calculation result of said low limit ignition timing calculating means based on a calculation result of said advance angle calculating means;

operating state predicting means for generating a prediction by predicting an operating state of said internal combustion engine where knocking is likely to occur; and ignition timing control means for controlling said ignition timing of said internal combustion engine based on said prediction, said ignition timing control means controlling said ignition timing of said internal combustion engine based on a calculation result of said second ignition timing calculating means in an operating state where knocking is likely to occur, and controlling said ignition timing of said internal combustion engine based on a calculation result of said first ignition timing calculating means in an operating state where knocking is unlikely to occur.

2. An ignition timing control system for internal combustion engines as claimed in claim 1, wherein said operating state predicting means includes maximum retardation angle calculating means for calculating a maximum retardation angle that is retarded from said basic ignition timing, said operating state predicting means predicting that said internal combustion engine is in an operating state where knocking is likely to occur when a calculation result of said advance angle calculating means is smaller than said maximum retardation angle.

3. An ignition timing control system for internal combustion engines as claimed in claim 1, wherein said operating state predicting means includes engine load sensing means for sensing a load on said internal combustion engine, said operating state predicting means predicting that said internal combustion engine is in an operating state where knocking is likely to occur based on a sensing result of said engine load sensing means.

4. An ignition timing control system for internal combustion engines as claimed in claim 2, wherein said maximum retardation angle is increased as a higher load is applied on said internal combustion engine.

5. An ignition timing control system for internal combustion engines as claimed in claim 4, wherein said low limit ignition timing calculating means includes means for obtaining said low limit ignition timing by subtracting said maximum retardation angle from said basic ignition timing.

6. An ignition timing control system for internal combustion engines as claimed in claim 5, wherein said retardation angle calculating means includes means for increasing said retardation angle by a predetermined angle each time knocking occurs in said internal combustion engine and means for decreasing said retardation angle by said predetermined angle when a predetermined time passes without knocking in said internal combustion engine; and wherein said advance angle calculating means includes means for decreasing said advance angle by a predetermined angle each time knocking occurs in said internal combustion engine and means for increasing said advance angle by said predetermined angle when a predetermined time passes without knocking in said internal combustion engine.

7. An ignition timing control system for internal combustion engines as claimed in claim 2, wherein said ignition timing control means includes means for controlling said ignition timing of said internal combustion engine based on said calculation result of said second ignition timing calculating means when said retardation angle calculated by said retardation angle calculating means is greater than a predetermined value.

8. An ignition timing control system for internal combustion engines as claimed in claim 5, wherein said ignition timing control means includes means for controlling said ignition timing of said internal combustion engine based on said calculation result of said second ignition timing calculating means when said retardation angle calculated by said retardation angle calculating means is greater than a predetermined value.

9. An ignition timing control system for internal combustion engines as claimed in claim 6, wherein said ignition timing control means includes means for controlling said ignition timing of said internal combustion engine based on said calculation result of said second ignition timing calculating means when said retardation angle calculated by said retardation angle calculating means is greater than a predetermined value.

10. An ignition timing control system for internal combustion engines as claimed in claim 7, wherein said predetermined angle is set to a value falling within a range of crank-angles between 2° and 5°.

11. An ignition timing control system for internal combustion engines as claimed in claim 9, further including means for setting said advanced angle based on a difference between said retardation angle and said maximum retardation angle and then for setting said retardation angle to zero when said ignition timing control means determines that said retardation angle is greater than said predetermined value, and then for starting said ignition timing control of said internal combustion engine based on said calculation result of said second ignition timing calculating means.

* * * * *